Aug. 16, 1960   J. K. WOOD   2,949,270
SPRING SUPPORT
Filed Oct. 8, 1957   9 Sheets-Sheet 1

INVENTOR:
JOSEPH KAYE WOOD
Curtis, Morris & Safford
ATTORNEYS.

Aug. 16, 1960  J. K. WOOD  2,949,270
SPRING SUPPORT

Filed Oct. 8, 1957   9 Sheets-Sheet 3

INVENTOR:
JOSEPH KAYE WOOD
BY
Curtis, Morris & Safford
ATTORNEYS:

United States Patent Office 2,949,270
Patented Aug. 16, 1960

2,949,270

SPRING SUPPORT

Joseph Kaye Wood, Stamford, Conn.

Filed Oct. 8, 1957, Ser. No. 689,000

22 Claims. (Cl. 248—54)

This invention is concerned with the improvement of spring supports of the type which are intended to exert a constant supporting force on loads, such as installed high temperature piping, but in which the load rod does not remain vertical throughout vertical and horizontal shifts of the load because the load is not a freely suspended body at all times, as has been assumed in the prior art.

More particularly, the present invention relates to improved spring constant supports which maintain an effective vertical line of action for the application of the supporting force to the load irrespective of arcuate movement of the load-supporting lever or levers of the lever system, first in installations wherein horizontal shift of the load does not occur, and second, in installations wherein horizontal shift of the load does occur.

In spring supports of the type with which this invention is concerned, the force of the spring means is transferred to the supported load by means of an intervening lever system having at least one load-supporting lever. The load is pivotally connected to this lever at a pivot point called the "load pivot." As the load moves up or down due to changes in temperature or other factors, the load-supporting lever swings about the point at which it is connected to the frame of the support, called the "main pivot." Thus, during operation the load pivot always swings along an arc about the main pivot. Whenever the movement of the load pivot becomes more than only a few degrees, its arc is found to bow out markedly away from a chord line drawn through the ends of the arc. In other words, as the angular travel of the load pivot increases, the horizontal displacement of the midpoint of its arc from the chord, called herein the "height of the arc," becomes increasingly large.

This arcuate movement of the load pivot causes the line of action of the supporting force to deviate from the vertical as the load moves vertically up and down. As a result, the supporting force varies from the desired constant value. The deviation of the supporting force from desired constancy increases as the "height of the arc" increases. This deviation of the supporting force from a constant value and the deviation of its line of action from a true vertical can introduce serious stresses into high temperature piping lines, which travel relatively large distances up and down during operation.

The present invention overcomes this problem of the height of the arc and positively assures that the line of action of the supporting force remains vertical at all times throughout the entire range of vertical movement of the load.

When the spring means and the geometric arrangement of the various operating levers are constructed in accordance with the factors described in detail further below, an absolutely constant and vertical supporting force is applied to the load over the entire range of movement. However, regardless of the particular spring and lever relationships involved in any given spring support, the present invention positively assures that the line-of-action of the supporting force is vertical and thus assures a more nearly constant supporting force at all times.

In accordance with the present invention, the line of action of the load supporting force is precisely determined and oriented by three connection points arranged in a triangular pattern. One of these connection points is the load pivot and the other two connection points are positively guided so as to lie along a line extending horizontal, i.e. perpendicular to the desired vertical line of support action. In several embodiments of my invention described herein these three connection points are fixedly oriented in a triangular pattern by a rigid linkage. One of the three points of connection of the rigid linkage is the load pivot and the other two points of connection are coupled to the load at two points along a line extending horizontal. In other words, the rigid linkage with the triangularly arranged points of connection is operatively interposed between the load lever and the load and positively assures a vertical supporting force at all times, irrespective of the height of the arc.

In the illustrative embodiments of my invention described herein, the two points of connection lying along the horizontal line are provided by a pair of horizontally spaced rollers engaging a horizontal track.

In the foregoing discussion the load was considered as moving only along a vertical path. In many instances the load will also have horizontal movement as well as vertical movement, and various ones of the illustrative embodiments of my invention also accommodate these horizontal shifts while maintaining the line of action of the supporting force vertical irrespective of (1) height of the arc and (2) horizontal shift or travel of the load.

Among the many advantages of certain embodiments of the present invention described hereinafter are those resulting from the fact that a symmetrically balanced spring support is provided with the effective point of support always vertically above the point of connection to the load. Effects of gravitation on the support both as to the load and component parts of the spring support itself are symmetrically balanced with respect to the line of support.

Among the advantages of certain embodiments of the present invention are those resulting from the fact that an improved constant support is provided having capacity for large loads, or for small, and enabling easy, convenient adjustments to be made in the field so as to accommodate large or small movements of the supported object, without changing the load capacity. In certain embodiments, the point of connection of the spring or springs to the supporting lever is common with the point of connection to the load thereto. Thus, any adjustment of the position of the common pivot point along the length of the supporting lever simultaneously adjusts the limits of the maximum vertical travel and also adjusts the effective length of the load moment arm and of the spring moment arm. As a result, the supporting force remains constant in spite of field adjustments to accommodate different amounts of vertical travel. So far as I am aware, spring supports prior to this invention have required two adjustments to be made so as to accommodate different amount of vertical travel. One of these adjustments was for travel and the other was to regain the desired supporting force. In this embodiment of my invention the supporting force always remains constant in spite of travel adjstment, over a very wide range.

Among the further advantages of the symmetrical spring supports described herein are those resulting from the fact that the load capacity is adjusted by screwing nuts along the top anchoring rod, called the "top rod."

Advantageously, the line of action of the load-supporting mechanism remains vertical and thus a linear vertical load position indication scale is enabled to be used which gives a linear indication of load position. This is in marked contrast to the arcuate types of scale utilized in the prior art.

Another advantage of certain spring supports described herein is the concentric relationship between the auxiliary or so-called "booster" springs which operate over a portion of the total travel and the main spring means which operate over the entire range of travel. As shown the booster springs are nested within the main spring means. Thus, any adjustments in the operating force of the main spring means provides a corresponding adjustment in the operation of the booster spring. In previous spring supports prior to the present invention the adjustment for the operation of the booster spring was required to be made separately from any adjustment to increase or decrease the supporting force. This concentric relationship of the main and booster springs enables a single adjustment to accomplish both main and booster spring adjustments. There is no requirement for careful correlation between two adjustments as in the prior art, it is automatic.

In this specification and in the accompanying drawings, are described and shown various embodiments of my invention in spring supports and various modifications thereof are indicated, and it is to be understood that these are not intended to be exhaustive nor limiting of my invention, but on the contrary are given for purposes of illustration in order that others skilled in the art may fully understand the invention and the manner of applying the invention in practical use so that they may modify and adapt it in various forms, each as may be best suited to the conditions of a particular use.

The various objects, aspects, and advantages of the present invention will be more fully understood from a consideration of the following specification in conjunction with the accompanying drawings, in which.

Figures 1, 2, 2A:
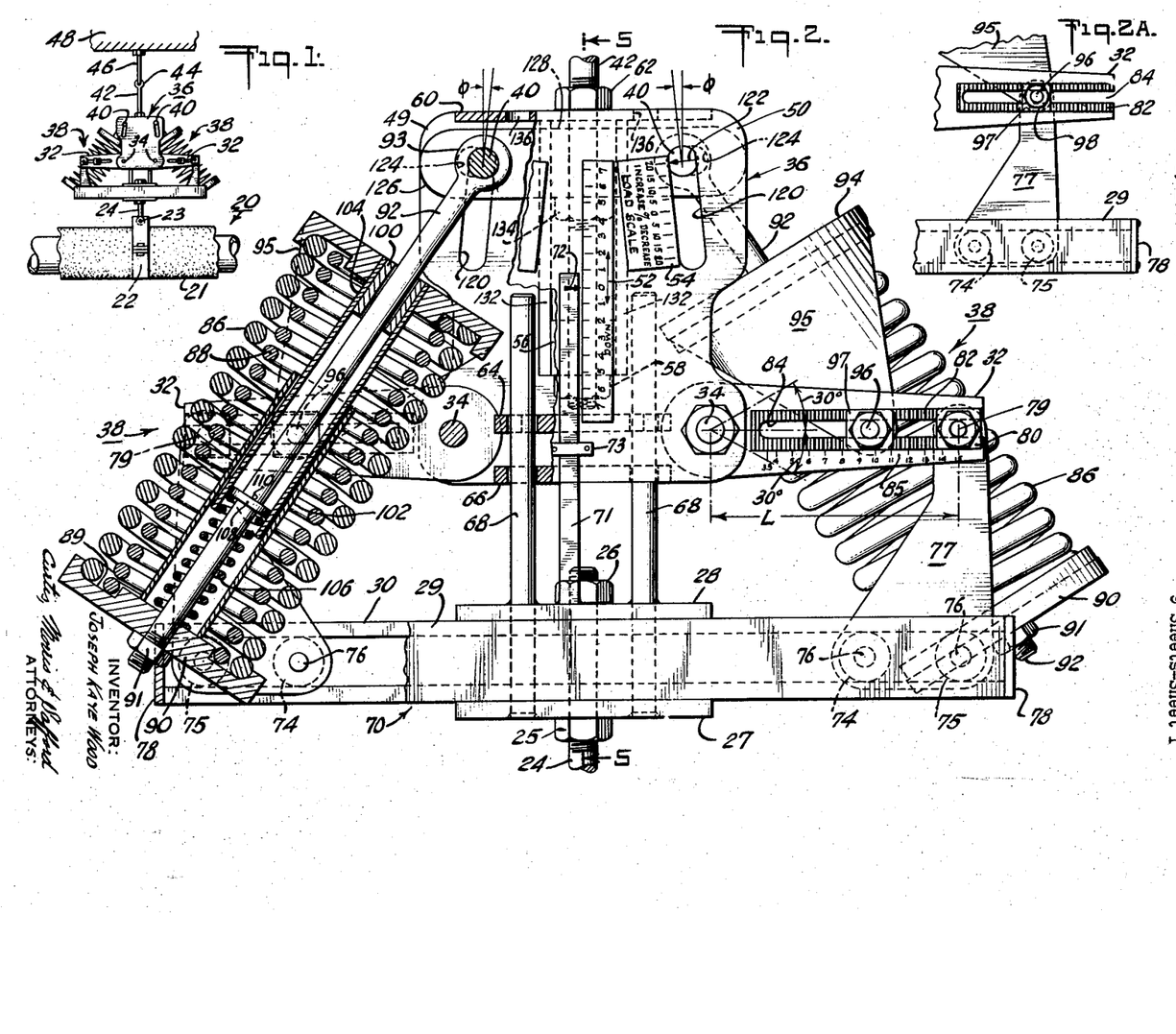
Figure 1 is a schematic illustration of an improved symmetrical spring support embodying the present invention, being shown as connected to a beam supporting a high temperature insulated piping line.
Figure 2 is a front elevational view partly broken away and partially in longitudinal section, shown on an enlarged scale of the spring support shown in Figure 1.
Figure 2A is a partial side elevational view of a modification of the spring support of Figure 2 wherein the load and spring means are connected to a common pivot adjustable in position along the load supporting arm.

Referring to the drawings in greater detail, as shown in Figure 1, a typical load is a length of installed high temperature piping 20 including a covering of insulation material 21. This load 20 is held by a pipe clamp 22 having at the top, a bolt 23 forming the load connection point. This bolt 23 is pivotally connected to a load rod 24 rigidly connected by nuts 25 and 26 (please see Figure 2) at its upper end to a pair of cross plates 27 and 28 which are spanned across between the center sections of a pair of parallel horizontal tracks 29 and 30.

In operation, as the load 20 moves up or down, this motion is transferred, as explained in greater detail further below, to two identical pairs of load-supporting levers 32, each pair being pivotally mounted by a corresponding pair of main pivots 34 at each end of the spring support frame 36. Only one lever 32 of each pair is seen in Figure 1. As the load moves up and down, these four load-supporting levers 32 swing about their respective main pivots 34 along arcuate paths extending up to 30° above and extending down to 30° below the horizontal mid-position, which is illustrated.

In order to apply a substantially constant supporting force to the load a pair of identical spring means 38 are provided, one at each end of the support frame. Each spring means is pivotally connected to one pair of the load-supporting levers and is pivotally anchored by a cross pin 40 at the upper corner of the support frame. As indicated in Figure 1, the frame 36 is mounted by a top rod 42 having an eye connection 44 to a fixed member 46 secured to a building beam 48, or other suitable fixed structure.

As seen in greater detail in Figures 2, 3, 4, and 5, the frame 36 of the spring support includes a pair of spaced plates 49 and 50 which are identical except that the front plate 50 includes a linear load position indication scale 52 and a pair of identical load capacity adjustment scales 54, whereas these scales may or may not also be included on the rear frame plate 49. Extending between the central areas of these frame plates and secured thereto is a main cross brace 56 (please see Figure 5) connected to the lower end of the top rod by a nut 58. A top frame plate 60 is rigidly fastened between the top edges of the frame plates 49 and 50 with a back up nut 62 on the top rod screwed down thereagainst. Between the lower portions of the frame plates 49 and 50 extend a pair of vertically spaced guide members 64 and 66 having aligned holes therein slidingly engaging the upper ends of four vertical guide rods 68 which project up from the cross pieces 27 and 28.

The two tracks 29 and 30 and the cross pieces 27 and 28 form an H-shaped supporting platform 70 as seen in plan view. This H-shaped supporting platform is positioned directly over and is symmetrically arranged with respect to the point 23 of connection to the load, and as a result it moves up and down with a movement corresponding exactly with load movement. Thus, this advantageously enables a direct reading linear load-position indication scale 52 to be utilized. As shown, the scale 52 reads "0" in the mid-position and has graduations reading to 7½ inches above and below this mid-position, thereby indicating a capacity for a full 15 inches of vertical travel. A pointer stick 71 runs up from the center of the track 29 along the face of the front plate 50 adjacent to the edge of the scale 52. An arrow index 72 at the upper end of this stick shows the reading for the load position. A slotted cleat 73 steadies this pointer.

The purpose of the guide rods 68 engaging in the guide members 64 is to assure that the supporting platform 70 remains horizontal and in aligned position beneath the support frame 36, particularly before the load is applied to the support.

Also, these guide rods 68 and members 64 and 66 may prove advantageous in installations wherein the load connection point 23 is known to have substantial horizontal component of movement and the H-shaped platform is positioned less than 12 inches above this load connection point. These guide rods 68 and the guide members 64 and 66 comprise vertical guide means for maintaining the desired relationship of each of the load-supporting pivots 79 to the supporting platform 70 and its supported load.

In order to compensate for the arcuate movement of the load-supporting levers 32 while maintaining the platform 70 vertically aligned over the load connection point 23, the tracks 29 and 30 are channel shaped, and their lower flanges are engaged at each end by pairs of rollers 74 and 75 rotatably mounted on stub axles 76 on the lower ends of four generally triangular roller link elements 77. To prevent the rollers from leaving the ends of the tracks 29 and 30 four bumper blocks 78 are removably secured to the ends of the tracks by machine screws, as shown most clearly at the lower left in Figure 3.

The upper ends of these four roller link elements 77 are pivotally hung from four shoulder bolts 79 (seen most clearly in Figures 3 and 4) forming "load pivots" on the load levers 32. These load pivots 79 are clamped in position on the four bifurcated load-supporting levers 32 by means of toothed clamping blocks 80 and nuts 81. The nut 81 holds the shoulder of the pivot bolt against the inner surface of the lever 32 and engages the teeth of the clamping block with mating serrations 82 extending along the outer surface of the lever on both edges of the slot 84.

The effective length of the load-supporting lever 32 is adjusted by loosening the nut 81 and moving the pivot 79 along the slot 84 to the desired position and then reclamping. This effective length is the distance between the axis of the main pivot 34 and the axis of the pivot 79 and is called the "load arm" L, as indicated in Figure 2. A scale 85 extending along the lever 32 beneath the serrations 82 indicates that the load arm can be adjusted from 3½ up to 15 inches in length as desired.

In most cases it is found desirable to adjust the load arm so that it is no more than equal to the total vertical travel expected because this enables the smallest size of spring to be used for any desired capacity. For example, when a 15-inch travel is expected in the installation, then the load pivot 79 is positioned at a load arm length of 15 inches. It will be understood that a 15-inch arm swinging 30° above and below the mid-position, for a total swing of 60°, effectively describes an equilateral triangle with the vertical distance between the extreme positions of the pivot 79 being equal to 15 inches, for the vertical travel as desired.

In increasing the efficiency of modern steam electrical generation plants, the operating temperatures and pressures are being increased to such levels that large expansions and contractions often occur, causing travels of the order of one foot or more. These travels are conveniently within the capacity of this spring support. In installations requiring lesser amounts of vertical travel, the load pivot 79 is accordingly moved inwardly and is positioned at the required load arm reading corresponding to the amount of vertical travel that is expected. A longer load arm may be used for any given vertical travel, if desired. But, it is not usually desirable to use a shorter load arm than the expected vertical travel, because the total angular movement of the levers 32 would then necessarily exceed the preferred 60° limit described above.

Figure 3:
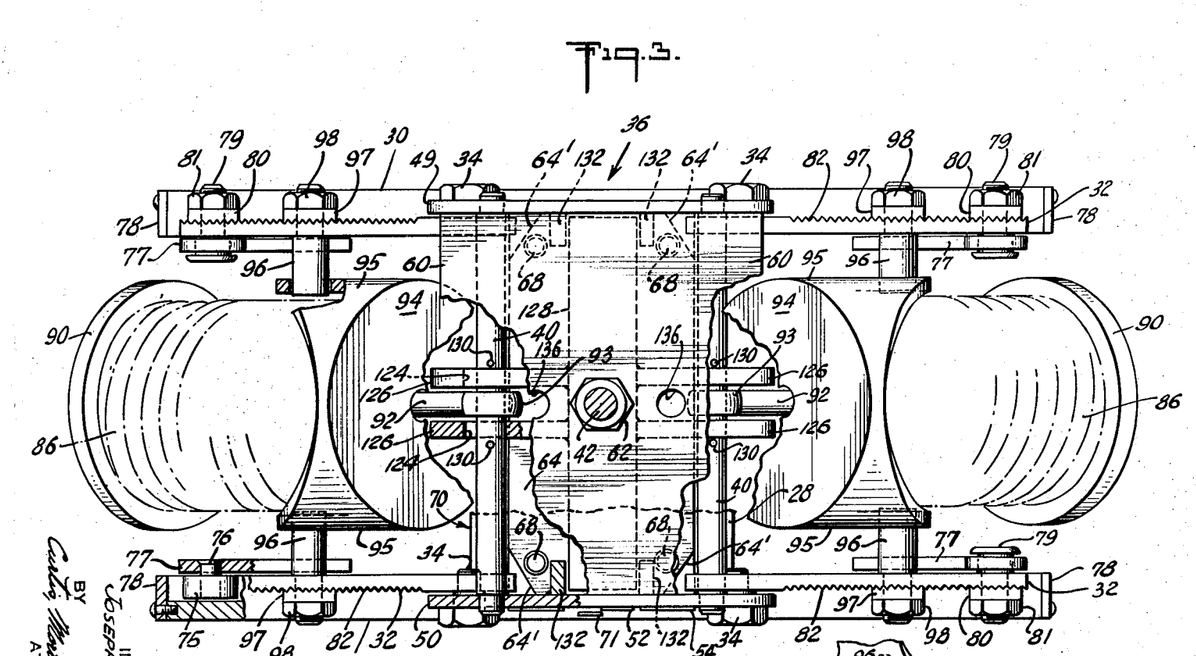
Figure 3 is a top plan view, shown partially broken away, of the spring support of Figure 2.

The main pivots 34 are provided by means of bolts having smooth inner ends of reduced diameter. These bolts are screwed inward through the lower corners of the frame plates 49 and 50 forming inwardly projecting stub shafts. In order to provide clearance for the inner ends of the levers 32, the upper guide member 64 of the frame has its corners cut back diagonally at 64' as indicated in Figure 3.

Figures 12, 13:
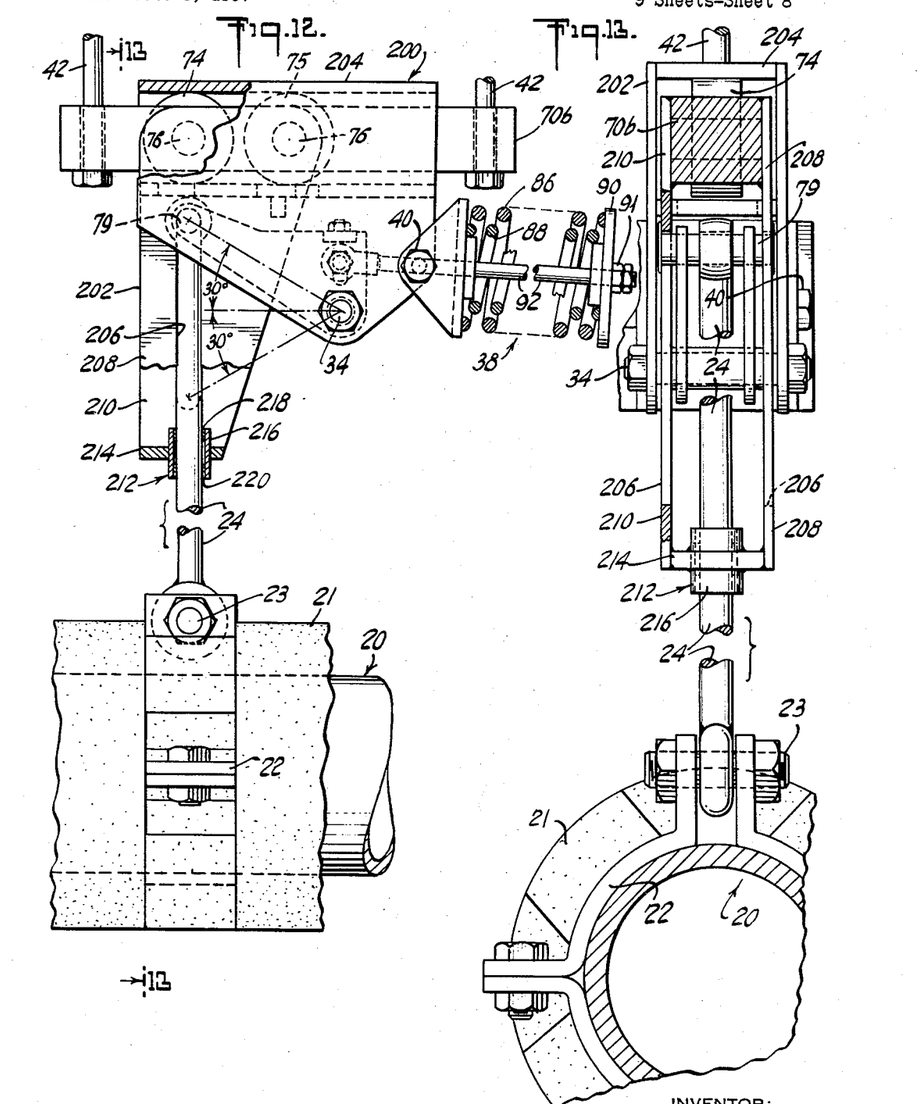
Figure 12 is a front elevational view of another spring hanger embodying the present invention wherein the hanger frame is mounted on rollers and the load rod extends down through a bearing sleeve on the hanger frame maintaining vertical the line of action of the supporting force.
Figure 13 is an end elevational view, on somewhat enlarged scale, of the support of Figure 12.
Figures 14, 15:
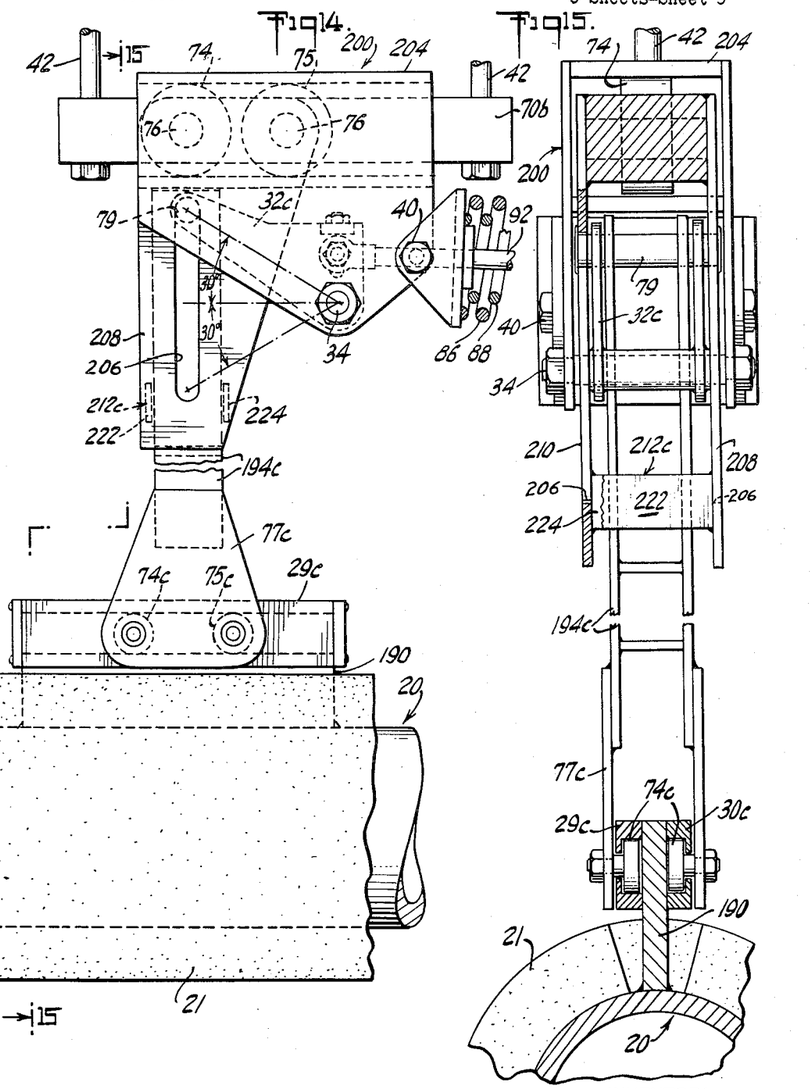
Figure 14 is a front elevational view of a modified spring hanger wherein rollers and track form the connection between the supported piping and modified guide mechanism maintains a vertical supporting force.
Figure 15 is an end elevational view, on somewhat enlarged scale, of the hanger of Figure 14.

When the highest values of load-supporting force are desired, the spring means 38 are arranged to include both an outer main spring 86 and an inner main spring 88 concentric therewith. For intermediate values of force only the two outer main springs 86 may be used, and for the lowest values, only the two inner main springs 88 may be used. By utilizing suitable spring nuts and sleeves such as are shown in Figures 12, 13, and 14 of my prior copending application Serial No. 384,691, filed October 7, 1953 now Patent No. 2,896,888, tension springs may be utilized as the spring means herein. However, I prefer to utilize compression springs having their lower and outer ends pressing against an annular groove 89 in a suitable spring end cover or cap 90 connected by a nut 91 to the free end of a spring rod 92. An eye 93 on the upper inner end of each rod passes around the corresponding cross pin pivot 40.

The upper end of each spring means 38 is received in a generally cylindrical socket 94 which has two sides cut away leaving a pair of curved triangular side portions 95 having bearing openings therein engaging the inner ends of trunnion pivot shafts 96. These pivots 96 are clamped onto the 10-inch mark of the load lever by means of a clamping block 97 and a nut 98. They are called the "spring pivots" on the load lever. It will be noted that the serrations 82 advantageously provide clamping surfaces for both of the clamping blocks 81 and 98 for the load pivot and spring pivot.

Figure 3A:
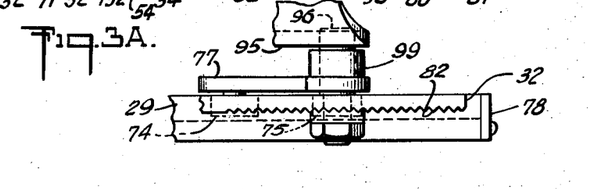
Figure 3A is a partial top plan view corresponding with Figure 2A.
Figure 4:
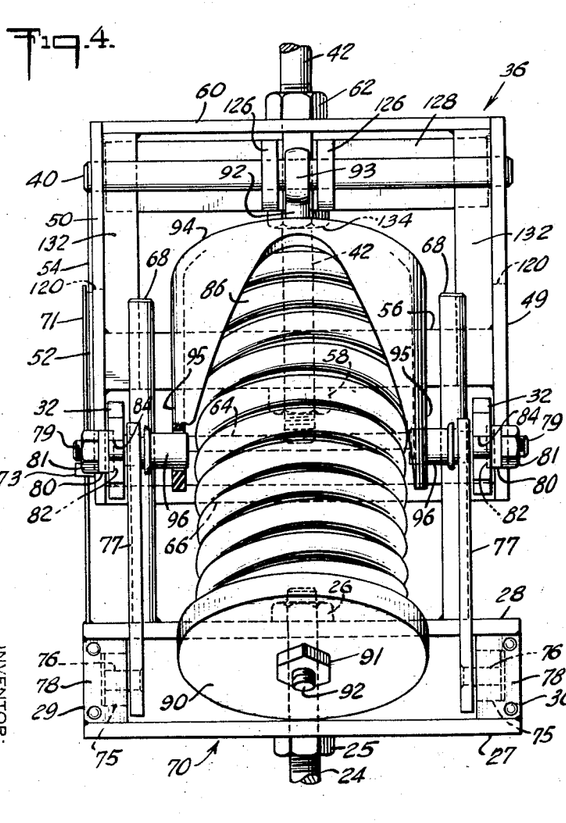
Figure 4 is an end elevational view of the support of Figure 2, as seen looking at the right end.

The spring pivot 96 can be adjusted along the slot 84 if desired for purposes of adjusting the load capacity. However, in most cases I find it preferable to leave the spring pivot at the 10-inch mark. One exception to this preference is in installations utilizing the modified spring support illustrated in Figures 2A and 3A wherein the spring pivot and load pivot are in common with each other. As shown in Figure 3A, the roller links 77 are suspended from the spring pivot 96 and are held in position by a suitable spacing collar 99. Thus, the pivot 96 acts as both the spring and load pivot. The advantage of this common pivot arrangement is the fact that load travel adjustments do not change the load capacity over wide ranges of load arm length L.

Directing attention back to Figure 2, when the spring pivot remains clamped at some given position along the slot 84, the load capacity is adjusted by moving the cross pins 40 up and down along the scales 54 toward and away from the main pivot. This load capacity adjustment mechanism is described in greater detail further below.

In order to maintain the axis of the spring means 38 aligned with the axis of the spring rod 92, this rod slides through a sleeve bearing 100 carried in the upper spring socket 94. Also, a pair of telescoping tubes 102 and 104 extend inwardly from the spring cap 90 and the socket 94, respectively, and have substantial overlapped lengths slidingly engaging each other. I prefer to provide thin sleeve bearings (not shown) at the inner ends of the telescoping tubes 102 and 104 where they engage each other. Thus, the two ends of each spring means are maintained accurately aligned with their respective spring rods 92.

In certain installations it is desirable to provide an auxiliary spring 106 called a "booster" spring which comes into action as the load-supporting lever moves below its approximate mid-position, but which has no effect above this position. This booster spring has a stiffness or spring constant which is only a few percent of the constants for the main springs. As shown in Figure 2, this booster spring 106 is concentric with the main springs 86 and 88 and surrounds the spring rod adjacent to the end cap 90. A washer 108 is engaged by an inwardly projecting pin 110 mounted at the desired position within the tube 104 and begins progressively compressing the booster spring as the load moves down from its approximate mid-position.

In order to adjust the load capacity, the ends of the cross pins 40 are arranged to slide up and down the guide slots 120. An index arrow 122 on the end of the rod indicates the scale reading from "0" up to a 20% increase and down to a 20% decrease. To prevent the cross pin from turning, its ends are flattened to engage the walls of the slot 120.

As shown most clearly in Figure 3, these cross pins 40 are held near their centers in horizontal slots 124 of a pair of spaced brackets 126 extending from opposite sides of a cross slide 128. These brackets straddle the eyes 93 of the respective spring rods 92, and when the cross slide 128 is raised or lowered, it moves the cross pins 40 up and down along the guide slots 120. A pair of pins 130 (please see Figure 3) extending through each cross pin engage the outer surface of the brackets and serve to hold the cross pins in position. The ends of the cross slide 128 rest in slideways along the inner surfaces of the frame plates 49 and 50 formed by pairs of spaced vertical guide strips 132 straddling the end of the cross slide. For added strength the lower ends of these strips 132 are also welded to the main cross brace 56, as indicated by the cut-away view near the center of Figure 2.

Figure 5:
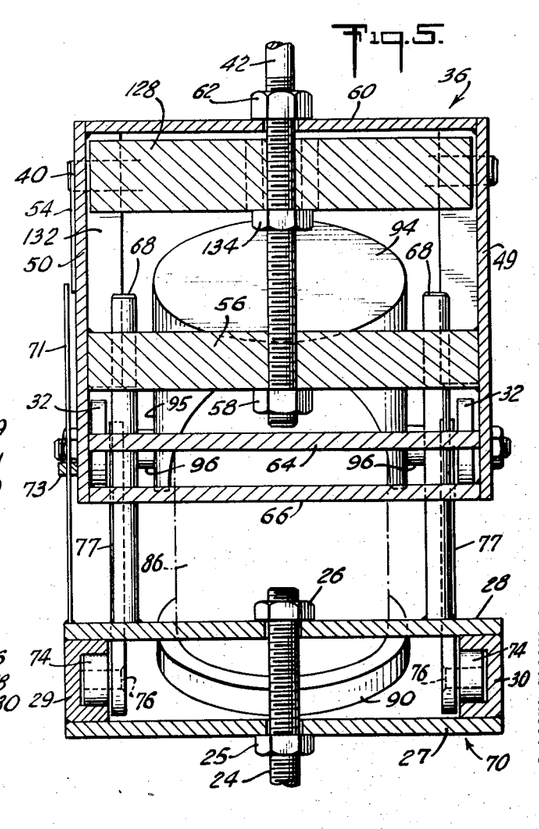
Figure 5 is a vertical cross sectional view taken along the line 5—5 of Figure 2 looking toward the left.

In order to provide for easy adjustment of the vertical position of the cross slide 128, as shown in Figure 5, the top rod 42 passes through a vertical hole in the cross slide, and a load-capacity adjusting nut 134 engages the lower face of the cross slide. As this nut is screwed down along the top rod, ends of the cross pins 40 correspondingly move down along the guide slots 120. This cross slide is shown in its uppermost position, corresponding with the 20% increase reading on the scales 54.

In certain installations it is convenient to have the load capacity adjustment already established and fixed when the spring support is shipped from the factory to the construction site. The top rod 42 usually is supplied by the installer at the site. Thus, in such cases I prefer to provide a pair of positioning bolts (not shown) which are inserted down through a pair of holes 136 in the top plate 60. These positioning bolts project down between the brackets 124 adjacent to the cross slide 128, and have nuts on their lower ends holding washers up against the lower edges of the brackets so as to hold the cross slide 128 at the desired position during shipment and installation.

These positioning bolts may remain inserted during use or may be removed after the adjusting nut 134 has been screwed into place against the cross slide. An advantage of leaving these positioning bolts in place results from the fact that they may be used to level the brackets 126 on opposite sides of the cross slide 128 in case one of the spring means tends to pull down more forcefully than the other due to commerical spring tolerance variations.

It will be noted that the longitudinal axes of the guide slots 120 (Figure 2) are aligned with the main pivots 34 and if extended would pass therethrough. In this embodiment, the slots 120 are inclined at an angle $\phi$ from the vertical so as to be offset from a vertical relationship with the main pivot 34. The angular shift $\phi$ is shown as being 5° and in combination with the booster springs 106 gives a very nearly constant supporting force over the full range of travel. The horizontal slots 124 accommodate the horizontal component of motion as the pins 40 move along the inclined slots 120.

In certain installations this angular shift $\phi$ may be reduced so that the pivot 40 is directly over the pivot 34 and moves vertically. In this case the guide slots 120 are omitted and the cross pins 40 are shortened to span only between the brackets 126, as shown in the embodiment of Figures 7 and 8.

Figure 6:
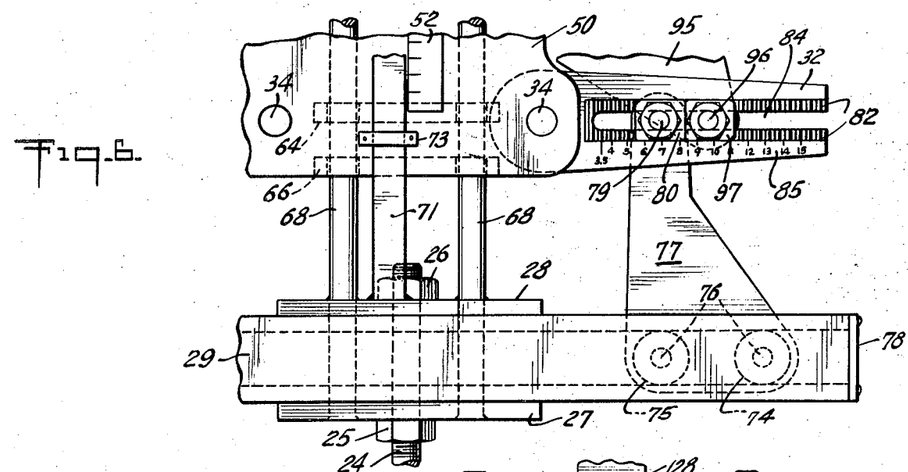
Figure 6 is a partial elevational view showing one of the roller links of the support of Figure 2 in reversed position.

As shown in Figure 6, when the load pivots 79 are positioned close to the main pivot, e.g. for a load arm reading of 7 inches or less, the roller links 77 are reversed so as to turn their toe rollers 74 outside of the rollers 75. This provides additional clearance near the center portions of the tracks 29 and 30.

In the embodiment of Figures 2–5 wherein the load pivot 79 and spring pivot 96 are separate, it will be apparent that the portion of the lever 32 occupied by the spring pivot clamping block 97 is a "blind spot" as regards the adjustment of the load pivot clamping block 80. Any specific load travel in this specific range is conveniently accommodated by positioning the two clamping blocks adjacent to one another and adjusting the spring anchoring pivot 40 to the desired load capacity position.

Figure 7:
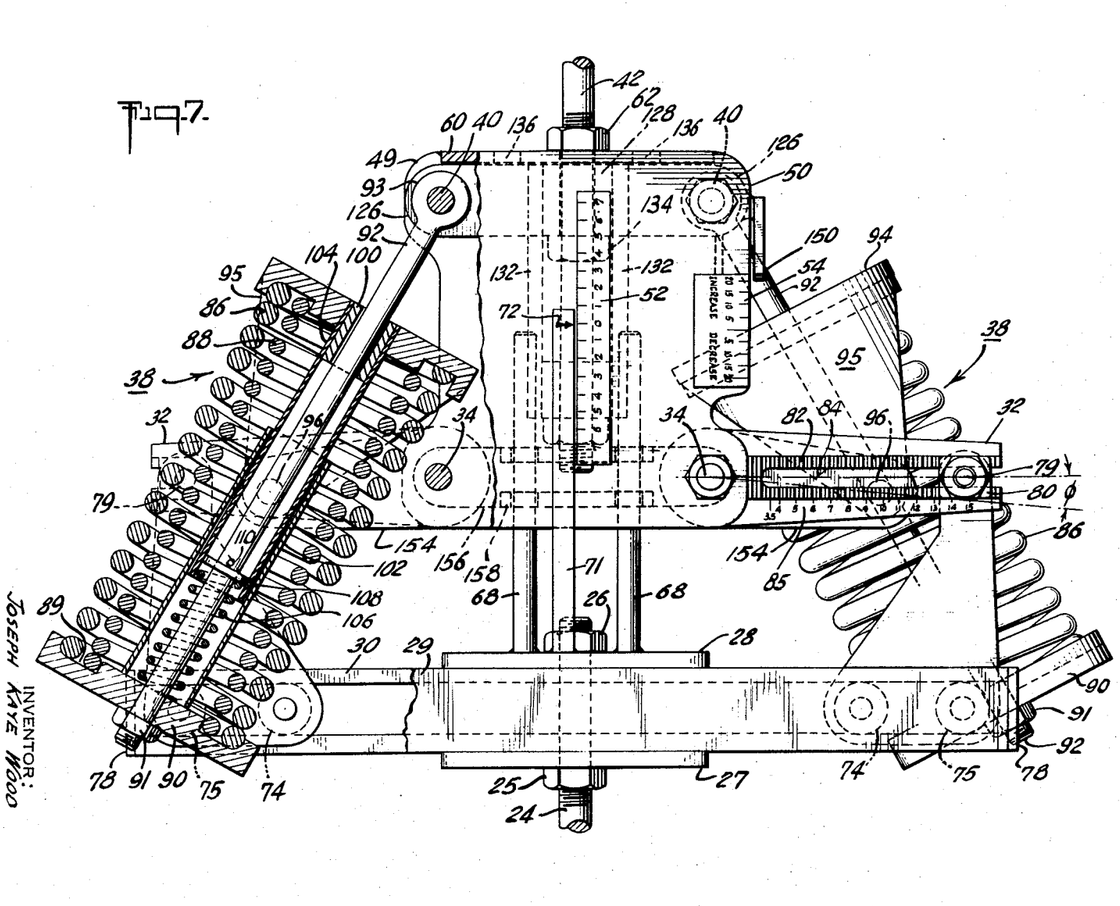
Figure 7 is a front elevational view, partly broken away and partially in longitudinal section of another symmetrically balanced spring support embodying the present invention.
Figure 8:
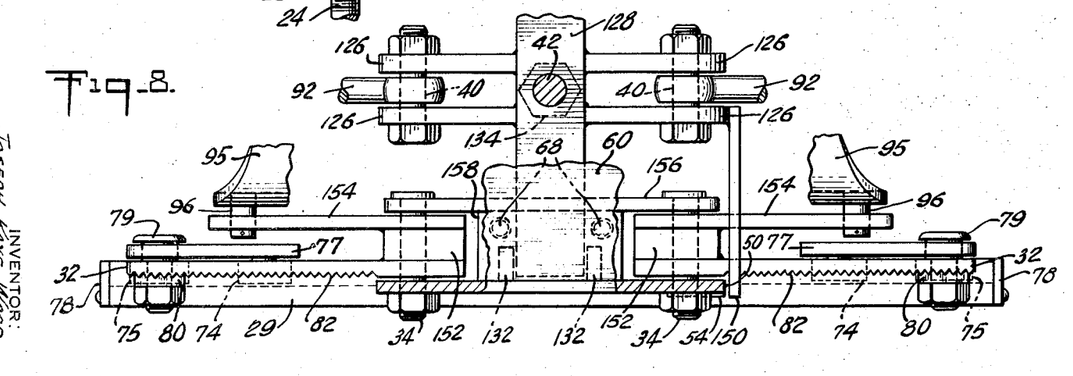
Figure 8 is a partial top plan view of the spring support of Figure 7.

The embodiment of my invention illustrated in Figures 7 and 8 is generally similar to that described above, except for the differences described below. Parts of this spring support performing functions corresponding to those of Figures 1–6 have corresponding reference numbers.

The spring anchoring pivots 40 are positioned directly above the main pivots 34 and move vertically when the cross slide 128 is adjusted up and down by means of the load-capacity adjusting nut 134.

In order to indicate load-capacity adjustment, an L-shaped pointer 150 is mounted on the end of the bracket 126 and extends down and out to the edge of the front frame plate 50 adjacent to the load-capacity adjustment scale 54. When a similar scale is carried on the rear frame plate 49, a T-shaped pointer is ued. The two arms of the T project out adjacent to the edges of the two respective scales so that the adjustment can be read from either side of the support.

As shown in Figure 8, the lever system of this support includes a load-supporting lever integrally connected by a hub block 152 to a spring lever 32, which, for example, has an effective length of 10 inches and is offset at an angle $\phi$ of 5° below the lever 32.

An advantage of this construction is that it enables the load pivot 79 to be positioned at any point along the length of the slot 84.

The main pivots 34 are longer than in the embodiment of Figures 1–6. Their inner ends are supported by a bearing brace 156 having a T shape as seen in plan view, with its center portion 158 secured to the respective frame plate 49 or 50. This portion 158 is formed by a pair of vertically spaced members as seen in dotted outline in Figure 7 having aligned guide holes therein slidingly engaging the rods 68. These members thus serve the same function as the guide members 64 and 66 seen in Figure 5.

In certain installations the angular offset $\phi$ may be reduced to zero, thus having the spring lever 154 and load lever 32 in parallel relationship.

Figures 9, 10:
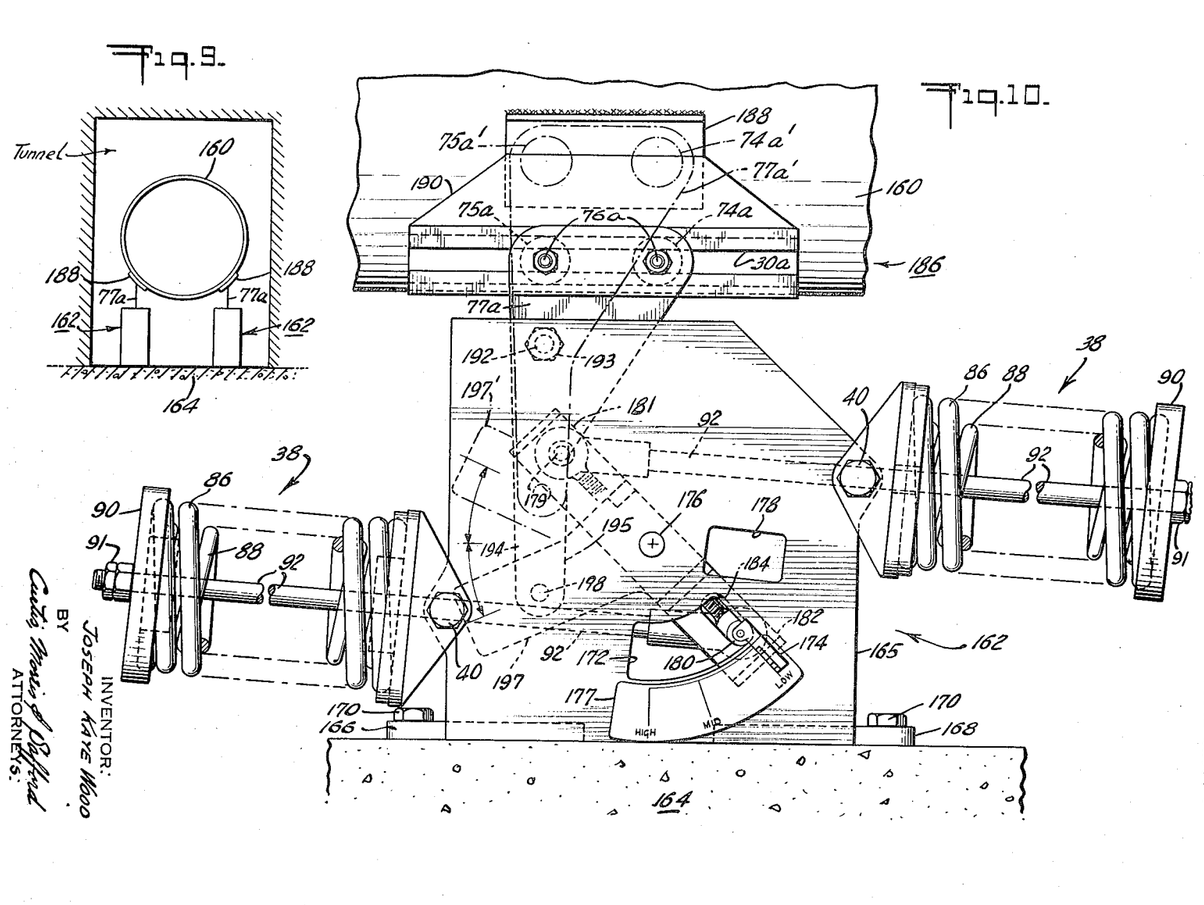
Figure 9 is a schematic end elevational view on reduced scale, and illustrating a large diameter gas line six feet in diameter supported from below by a pair of spring supports.
Figure 10 is a front elevational view, on enlarged scale, illustrating one of the spring supports of Figure 9 and showing the supporting arrangement embodying the present invention and including rollers and a track and vertical position guidance mechanism.
Figure 11:
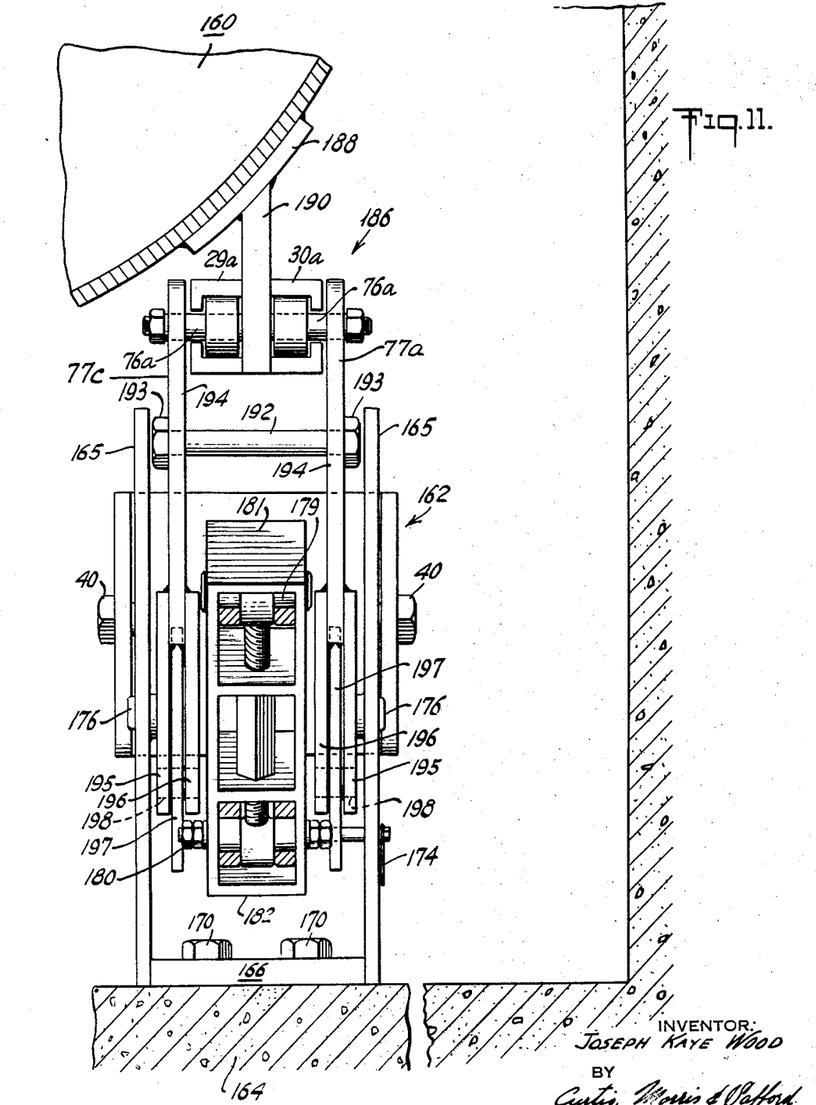
Figure 11 is an end elevational view of the support of Figure 10.

In the embodiment of my invention shown in Figures 9, 10, and 11, a large gas conduit load 160 having a diameter of approximately six feet is illustrated as being supported in a tunnel by means of a pair of spring supports 162 mounted on the concrete foundation 164.

Each of these spring supports 162 is identical with those disclosed in my above-identified prior copending application Serial No. 384,691, filed October 7, 1953, Patent No. 2,896,888, except that the side frame plates are generally rectangular in shape with a pair of transverse braces 166 and 168 between their lower edges serving as anchoring feet engaging the foundation bolts 170. Also, the arcuate window 172 in the side frame 165 which provides clearance for the load-position and load-capacity scale indicator 174 is located below the main pivot 176. The arcuate scale 177 has index marks cooperating with the indicator 174 for indicating load position.

A second window 178 is provided near the main pivot to give access to the turnbuckle load-capacity adjustment mechanism in the hub of the lever system. This adjustment mechanism simultaneously moves the spring pivots 179 and 180, respectively, along the diametrically opposed spring levers 181 and 182. As explained in detail in my copending application the spring pivots 179 and 180 are guided by elongated openings 184 in the spring levers.

In this example, the conduit 160 carries gases at high temperatures for heat exchange purposes and is subjected to relatively large amounts of horizontal expansion or contraction as well as vertical travel. For purposes of accommodating the horizontal movement while maintaining the effective line of support action vertical, there is provided a track and guidance mechanism, generally indicated at 186.

This roller and guidance mechanism 186 includes a cylindrical saddle 188 (please see also Figure 11) which is welded to the wall of the conduit so as to distribute the stress. A trapezoidal-shaped web 190 projects vertically down from this saddle and forms a pair of channel-shaped or C-shaped tracks 29a and 30a arranged back-to-back along its lower edge. Pairs of rollers 74a and 75a engage these tracks, being carried by stub axle shafts 76a mounted on triangular roller link elements 77a, which are rigidly braced apart by a shouldered screw rod 192 and nuts 193. The apex of each of these roller links 77a is extended down in a rigid leg 194 having a clevis connection 195 and 196 straddling a load-lever arm 197 and pivotally connected thereto by a load lever pivot 198.

In operation, the load lever 197 swings up and down about a horizontal mid-position as indicated by the arcuate arrows in Figure 10. By virtue of the pairs of rollers 74a and 75a, the supporting legs 194 are always vertically aligned above the load lever pivot connection, thus maintaining the desired vertical action of the supporting force.

Figures 9, 10, and 11 indicate the load as being in its lowest position. The upper position of the load lever is indicated in dash and dot outline at 197' and the upper positions of the rollers and link at 74a', 75a' and 77a', respectively.

Reviewing the operation of the foregoing embodiments it is noted that the rollers 74 and 75, or 74a and 75a, as the case may be, form two connections engaging horizontal guide means defined by the horizontal track segments 29 and 30, or 29a and 30a, respectively. The rigid linkage 77 or 77a maintains a fixed triangular orientation between these two connections and the load pivot connection on the load-supporting lever. Thus, the vertical line of action of the supporting force is maintained vertical with respect to the horizontal guide means.

It is to be noted that the moment about the main pivot caused by the spring means varies in a manner which follows a true sine curve if the spring is arranged so that its distortion is equal to the distance between the spring-anchoring pivot point 40 and the point of connection 96 of the spring to the spring lever. This is called the $H=0$ condition and the spring moment is modified from a sine curve to the extent that the spring is distorted from the $H=0$ condition. This follows from the curves and mathematical analysis given in my prior Patents Nos. 1,937,135 and 2,145,704. By virtue of the fact that the line of action of the load-supporting force is positively maintained vertical at all times irrespective of (1) height of the arc, with or without (2) horizontal movement of the load, the load moment curve also becomes a true sine curve, for it is always acting vertically on the load-supporting lever. By matching the phase of the sinusoidal load moment curve with the phase of the sinusoidal spring moment curve, an absolutely constant supporting force is obtained. This matching of phases occurs when the angle between the vertical and the load-supporting lever equals the angle between the spring lever and a line passing through the main pivot and the spring-anchoring pivot.

In the embodiment of Figure 7 wherein the spring-anchoring pivot 40 is vertically above the main pivot 34, then, properly matched moment curves for providing an absolutely constant supporting force are obtained when the load-supporting lever is parallel with the spring lever or when a single lever is used both as the load-supporting lever and as spring lever, either by having a common pivot such as shown in Figures 2A and 3A, or by having a separate load pivot and spring pivot on the same lever as shown in Figure 2.

However, regardless of whether the spring support is arranged to give matched phases of a perfect sine load-moment and a perfect sine spring-moment or whether another arrangement is used, the present invention provides improved results in operation by assuring that the line of action of the load-supporting force is always vertical.

The embodiment of the present invention shown in Figures 12 and 13 includes a spring support mechanism, generally indicated at 200, which is generally similar to that disclosed in my copending application Serial No. 666,705, filed June 19, 1957, except for the differences described hereinafter. Parts performing functions corresponding to those of previous embodiments have corresponding reference numerals.

This embodiment of my invention is especially adapted for use in installations wherein the pipe clamp pivot point 23 only moves vertically so that no horizontal shift of the load is involved. As seen in Figure 12, the support frame 202 has an inverted U-shape and the under surface of the top plate 204 forms a horizontal guide track engaged by a pair of rollers 74 and 75. These rollers are rotatably mounted on shafts 76 within an opening in a horizontal platform 70b secured by a pair of mounting rods 42 to a fixed structure such as a building beam. Thus, the support frame 202 is enabled to move horizontally with respect to the supporting platform 70b.

In order to maintain the load pivot 79 directly over the pipe clamp pivot 23, the load pivot is formed as a headed shaft engaging a pair of vertical slots 206 in a pair of spaced vertical guide members 208 and 210 which are rigidly secured to the platform 70b. As the load pivot 79 swings about the main pivot 34, the support frame 202 is moved longitudinally over the rollers 74 and 75 so that the load pivot 79 moves vertically along the slots 206 always vertically aligned with the load connection 23. Thus, the vertical guide members 208 and 210 and the ends of the load-supporting pivot 79 comprise vertical guide means for maintaining the load-supporting pivot directly above the supported load connection 23.

A sleeve bearing 212 is held between the lower ends of the guide members 208 and 210 by a cross piece 214. This bearing includes a vertical tube 216 with two bearing collars 218 and 220 secured in opposite ends of the tube and slidingly engaging the load rod 24.

The spring support of Figures 14 and 15 is generally similar to that illustrated in Figures 12 and 13, except that the load rod is widened so as to provide increased stiffness for resisting any tendency to bend due to horizontal shifting of the load. This embodiment of my invention readily accommodates large amounts of horizontal travel. A supporting web 190 is secured to the piping load 20 and includes a pair of horizontal channel-shaped or C-shaped guide tracks 29c and 30c arranged back-to-back. Pairs of rollers 74c and 75c engage these tracks and are rotatably mounted on a triangular roller link 77c having a rigid leg 194c extending upwardly and pivotally secured at 79 to the load-supporting arm 32c. This rigid leg forms the load rod which is widened in a direction parallel with the tracks 29c and 30c, thus having its maximum bending strength aligned in the direction of horizontal load movement. A sliding bearing 212c is provided by a pair of straps 222 and 224 fastened between the lower ends of the guide members 208 and 210.

The upper set of rollers 74 and 75 accommodate the height of the arc and the lower rollers 74c and 75c accommodate any horizontal movement of the load. As a result a vertical line of action of the load supporting force is maintained at all times.

From the foregoing it will be understood that the embodiments of the present invention described above are well suited to provide the advantages set forth, and since many possible embodiments may be made of the various features of this invention and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. An improved constant support of the spring type in which the force of the spring means is transferred to the supported load by means of an intervening lever, said improved support providing an effective vertical line of action of the supporting force to the load irrespective of arcuate movement of the lever comprising a frame, mounting means secured to the frame for mounting said frame in a fixed position, at least one lever swingably mounted on said frame by a main pivot, spring means operatively connected between said frame and said lever for applying a turning moment to the lever, said lever having a pivot thereon swingable in an arc about the main pivot, a rigid link connected to said arcuately movable pivot, and horizontal guide means having two interengaging parts, one of said parts including a straight horizontal track and the other of said parts including bearing means engaging said track in at least two spaced points, said track and bearing means being relatively movable, one of said interengaging parts being connected to said rigid link and the other being arranged for connection to a supported load.

2. An improved spring support as claimed in claim 1 wherein said bearing means comprises at least two spaced rollers in rolling engagement with said straight track.

3. An improved spring support as claimed in claim 2 and wherein at least two rollers are connected to said rigid link, said rollers and said arcuately movable pivot being arranged in a triangular pattern on said rigid link, and a load support secured to said horizontal track and adapted for connection to the load.

4. An improved spring support as claimed in claim 3 and wherein the axis of one of said rollers on the rigid link lies along a vertical line passing through the axis of said arcuately movable pivot, and the other of said rollers on said rigid link is horizontally offset from said vertical line, thereby defining a right triangle, with said pivot and said other roller being at the acute vertices of said right-triangle, and said one roller being at the right-angled corner of said right-triangle.

5. An improved spring support as claimed in claim 4 and wherein said arcuately movable pivot is arranged to release said rigid link from said lever and said rollers are disengageable from said straight track, whereby said rigid link is reversible in operation.

6. An improved spring constant support of the type in which the force of the spring means is transferred to the supported load by means of an intervening lever, and providing an effective vertical line of application of the supporting force to the load irrespective of arcuate movement of the lever, said support comprising a spring device including a frame having at least one lever swingably mounted thereon by a main pivot, spring means, a spring anchoring pivot on the frame and means swingably coupling the spring means to said anchoring pivot, a spring pivot on said lever, connection means securing said spring means to said spring pivot, a mounting member adapted to be connected to the fixed structure of a building and the like and a load-supporting member adapted to be connected to the load, horizontal guide means having two interengaging parts, one of said parts including a straight horizontal track and the other of said parts including bearing means engaging said track in at least two points spaced along the length of said track, said track and bearing means being relatively movable, one of said parts being connected to one of said members and the other part being connected to the spring device, a load-supporting pivot on said lever, and vertical guide means engaging said load-supporting pivot and being connected to one of the parts of said horizontal guide means for maintaining said load-supporting pivot directly above the supported load.

7. An improved spring support as claimed in claim 6 and wherein said bearing means comprises at least two horizontally spaced rollers in rolling engagement with said straight track.

8. An improved spring support as claimed in claim 6 and wherein said rollers are rotatably secured to said mounting member and said frame has an inverted U-shape with the bight of the U forming the horizontal track, said vertical guide means being rigidly secured to said mounting member.

9. An improved spring support as claimed in claim 6 and wherein one of the parts of said horizontal guide means is secured to said mounting member and the other part is secured to said frame, and said vertical guide means is rigidly secured to said mounting member.

10. An improved spring support as claimed in claim 9 and wherein said vertical guide means includes a pair of parallel spaced guide members having elongated openings therein forming guideways engaging opposite ends of said load-supporting pivot.

11. An improved spring support as claimed in claim 10 and wherein said parallel spaced guide members have a sleeve bearing secured between their lower ends, and a load rod passing vertically through said sleeve bearing and being connected to said load-supporting pivot.

12. An improved spring constant support having symmetrical balance with respect to a vertical line of action of the load-supporting force comprising a frame, first and second levers at opposite ends of said frame, first and second main pivots swingably mounting said respective levers on said frame, said levers in operation swinging in opposite directions about their respective main pivots, first and second spring means operatively connected between said frame and said respective levers for applying a turning moment to the levers, first and second pivots on said respective levers movable along opposed arcs about said respective main pivots, first and second rigid linkages mounted on said respective arcuately movable pivots, a platform including horizontal guide means engaging each of said linkages, said linkages being horizontally movable with respect to said platform, said platform maintaining said linkages in horizontally aligned relationship irrespective of arcuate movement of both of said movable pivots, said platform being vertically movable in response to the swinging movement of said levers, and load-supporting connection means secured to said platform, said platform being adapted to be symmetrically connected to the load.

13. An improved spring constant support as claimed in claim 12 and wherein said platform includes a straight horizontal track and said rigid linkages each include bearing means engaging said straight track and movable along said track.

14. An improved spring constant support as claimed in claim 13 and wherein said bearing means are at least two spaced rollers rotatably mounted on each linkage, the movable pivot and rollers of each linkage defining a triangular pattern.

15. An improved symmetrical spring constant support as claimed in claim 12 and wherein two interengaging parts are provided and vertically movable one with respect to the other, one of said parts being connected to the frame and the other to the platform, thereby providing vertical guide means coupled between said platform and said frame.

16. A spring support for exerting a constant vertical pull on a load movable upwardly and downwardly within a limited range, comprising a frame, a lever, a main pivot mounting said lever on said frame, spring means, an anchoring pivot on the frame to which the spring means are operatively connected, a spring pivot having its axis parallel with said main pivot and connecting the spring means to the lever so as to produce a turning moment about the main pivot, a load pivot on said lever having its axis parallel with said main pivot, a connection for the load to said load pivot producing a load turning moment in an angular direction about the main pivot opposed to the direction of the turning moment of said spring means, a vertical guide on the frame, a load-capacity adjustment slide which is slidable along said vertical guide, said anchoring pivot being carried by said slide, a top rod for mounting said frame to a fixed structure, the lower end of said top rod being threaded, and a load capacity adjusting nut thereon engaging said vertically movable slide for adjusting the load capacity of the support.

17. A spring support as claimed in claim 16 wherein said frame also includes inclined guide means, said vertically adjustable slide including a horizontal slot, said spring anchoring pivot passing through said slot, and the ends of said spring anchoring pivot engaging said inclined guide means, the longitudinal axis of said inclined guide means being directed toward the axis of the main pivot.

18. A spring support for exerting a constant vertical pull on a load including means enabling simultaneous adjustment of load travel and load capacity comprising a frame, a load-supporting lever, a main pivot rotatably mounting said lever on said frame, spring means, a spring-anchoring pivot on the frame to which said spring means are swingably connected, an adjustable pivot on said lever swingably connecting said spring means to said lever and having its axis parallel with the main pivot to produce a turning moment on said lever about the main pivot, said pivot being adjustable in position along the length of said lever, means for securing said adjustable pivot in the desired position, and load-supporting connection means connecting the load to said adjustable pivot.

19. An improved spring support for providing a constant supporting force to a load, said support having a frame, a lever swingably mounted on said frame for movement above and below a horizontal position, means coupling said lever to the load, a main compression spring first mounting means adapted to engage one end of said main spring, said first mounting means having a pair of trunnion pivots for providing a pivot connection to said lever for applying a turning moment to said lever for supporting the load over the full range of movement of said lever, second mounting means adapted to engage the opposite end of said spring, a rod secured to said second mounting means and extending along the axis of said spring and passing through said first spring mounting means, said rod being swingable connected to said frame, and a compression booster spring nested within and concentric with said main spring means, said booster spring surrounding said rod, actuating means for providing engagement with one end of said booster spring upon movement of the lever below the horizontal, the other end of said booster spring engaging one of said spring mounting means, said booster spring being released from compression during movement of the lever above its horizontal position.

20. An improved spring constant support for a piping load having a vertical movement during operation and a longitudinal horizontal shift during operation, said support comprising a frame, a lever swingably mounted on said frame, spring means for applying a turning moment to said lever, a load-supporting pivot on said lever, a rigid member extending vertically and being connected to said pivot, said member having substantial width in the longitudinal direction of horizontal shift, fixed guide means on the frame slidingly engaging said member and maintaining said member vertical, and a pair of rollers and a horizontal track closely adjacent to the load, said track extending in a direction longitudinally of the load and connecting said vertical member to the load.

21. A spring-operated support for providing a constant supporting force to piping and similar supported loads comprising a frame having a pair of side plates with a top portion extending therebetween, a lever, a main pivot swingably mounting said lever between said side plates, spring means swingably connected to said side plates and a load rod connecting said spring to said lever, a support member adapted to be connected to a fixed structure, a pair of horizontally spaced rollers carried by said member and rollingly engaging the top portion of said frame for supporting said frame, a guide plate secured to said member and having a vertical slot therein, said lever having a load-supporting pivot engaging in said guide slot, a vertical load-supporting element carried by said load-supporting pivot, and vertical guide means secured to said guide plate and engaging said vertical element for maintaining said element vertical, whereby said frame is moved to offset the horizontal component of motion of the load-supporting pivot arising from the arcuate movement of the load-supporting pivot about the main pivot, thereby enabling the load-supporting element to remain vertical in spite of the arcuate movement of said load-supporting pivot about the main pivot.

22. A spring-operated support for providing a constant supporting force to piping and similar supported loads comprising a frame having a pair of side plates, a lever, a main pivot swingably mounting said lever between said side plates, spring means swingably connected to said side plates and a load rod connecting said spring means to said lever, a support member adapted to be connected to a fixed structure, a pair of horizontally spaced rollers for supporting said frame from said fixed member and providing freedom of movement of said frame with respect to said fixed member, a guide plate secured to said fixed member and having a vertical slot therein, said lever carrying a load-supporting pivot engaging in said guide slot, a vertical load-supporting element carried by said load-supporting pivot, and vertical guide means secured to said guide plate and slidingly engaging said vertical element for maintaining said element vertical, whereby said frame is moved to offset the horizontal component of motion of the load-supporting pivot arising from the arcuate movement of the load-supporting pivot about the main pivot, thereby enabling the load-supporting element to remain vertical in spite of the arcuate movement of said load-supporting pivot about the main pivot, a horizontal track, and a second pair of rollers supporting the supported load from the lower end of said vertical element.

References Cited in the file of this patent

UNITED STATES PATENTS

| 1,612,163 | Todd | Dec. 28, 1926 |
| 2,395,730 | Farkas | Feb. 26, 1946 |
| 2,709,057 | Gould | May 24, 1955 |